(12) United States Patent
Eck et al.

(10) Patent No.: US 6,803,759 B2
(45) Date of Patent: Oct. 12, 2004

(54) PASSIVE MAGNETIC POSITION SENSOR

(75) Inventors: Karl Eck, Frankfurt (DE); Zlatko Penzar, Frankfurt (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/475,154

(22) PCT Filed: Mar. 21, 2002

(86) PCT No.: PCT/DE02/01034
§ 371 (c)(1),
(2), (4) Date: Oct. 15, 2003

(87) PCT Pub. No.: WO02/086917
PCT Pub. Date: Oct. 31, 2002

(65) Prior Publication Data
US 2004/0130319 A1 Jul. 8, 2004

(30) Foreign Application Priority Data
Apr. 19, 2001 (DE) ......................... 101 19 317

(51) Int. Cl.⁷ ............................................. G01B 7/00
(52) U.S. Cl. ................................................ 324/207.24
(58) Field of Search ....................... 324/207.11–207.14, 324/207.2, 207.21–207.24; 33/700, 703, 705, 708

(56) References Cited

U.S. PATENT DOCUMENTS 6,070,337 A * 6/2000 Wallrafen .................... 33/708

* cited by examiner

Primary Examiner—Bot LeDynh
(74) Attorney, Agent, or Firm—Richard A. Speer; Mayer, Brown, Rowe & Maw LLP

(57) ABSTRACT

The invention relates to a magnetic passive position sensor, comprising a substrate (1) with a resistance network (2) which is arranged on this substrate (19) and is assigned a contact spring structure (8), which can be deflected under the action of a permanent magnet (11), with electrical connection between the resistance network (2) and the contact spring structure (8) being established by contact which is dependent on the position of the permanent magnet (11), the contact spring structure (8) and the resistance structure (2) being enclosed in a sealed housing (1, 12) and the permanent magnet (11) being movable outside the sealed housing (1, 12) and having flux concentration, structure associated therewith.

4 Claims, 4 Drawing Sheets

PASSIVE MAGNETIC POSITION SENSOR

BACKGROUND OF THE INVENTION

The invention relates to a passive magnetic position sensor, comprising a substrate with a resistance network which is arranged on this substrate and is assigned a contact spring structure, which can be deflected under the action of a permanent magnet, with electrical connection between the resistance network and the contact spring structure being established by contact which is dependent on the position of the permanent magnet, the contact spring structure and the resistance structure being enclosed in a sealed housing and the permanent magnet being movable outside the sealed housing.

Such a position sensor is known from DE 196 48 539. The resistance network and the contact structure are in this case arranged on a substrate. A magnetic device which is connected to a movable object, the position of which is to be determined, causes the contact spring structure to be deflected in such a way that it contacts the resistance network and an output signal corresponding to the position of the moved object can be picked up at the position sensor.

A magnetic position sensor of the type described is only a few centimeters long. To permit reliable operation of the position sensor, the magnet therefore cannot be increased in size without any limit, since this would have the consequence that many spring legs of the contact spring structure are simultaneously attracted by the magnet, with the result that the output signal of the sensor no longer provides unequivocal signals and is consequently no longer usable.

The invention is consequently based on the object of providing a passive magnetic position sensor with improved magnetic force of the permanent magnet.

BRIEF SUMMARY OF THE INVENTION

According to the invention, the object is achieved by the permanent magnet being polarized in the direction of movement of the contact spring structure, a flux guiding device for concentrating the force of attraction of the undisturbed magnetic field being arranged near the permanent magnet.

The invention has the advantage that, on account of the flux guiding body, the pattern of the undisturbed magnetic field is changed to such an extent that its gradient is increased in the direction transverse to the housing. The magnetic field formed by the permanent magnet in which no housing with a resistance network and contact spring structure is introduced is considered as the undisturbed magnetic field. On the basis of this measure, the force of the magnetic field can be intensified without the geometrical dimensions having to be changed.

A simple development of the invention is that the flux guiding device is formed as a magnetically permeable cap which can be fitted onto the permanent magnet. Such a cap has a u-shaped cross section, at the free ends of which virtual magnetic poles form. Consequently, the undisturbed magnetic field (field in the air) is concentrated to such an extent that a considerable increase in the field gradient can be achieved transversely to the direction of the sensor housing at the position of the housing.

In another refinement, the flux guiding device comprises two additional auxiliary magnets, the permanent magnet being arranged between the two auxiliary magnets and the direction of magnetization of the auxiliary magnets being opposed to the direction of magnetization of the permanent magnet.

The magnetic force of the permanent magnet can in this case be utilized particularly fully if the housing is nonmagnetically formed and consequently the forces act undamped on the contact spring structure.

BRIEF DESCRIPTION OF THE DRAWINGS

The invention allows numerous embodiments. One of these is to be explained in more detail on the basis of the figures represented in the drawing, in which.

The same features are identified by the same reference numerals in all the figures.

DETAILED DESCRIPTION OF THE INVENTION

Figure 1:
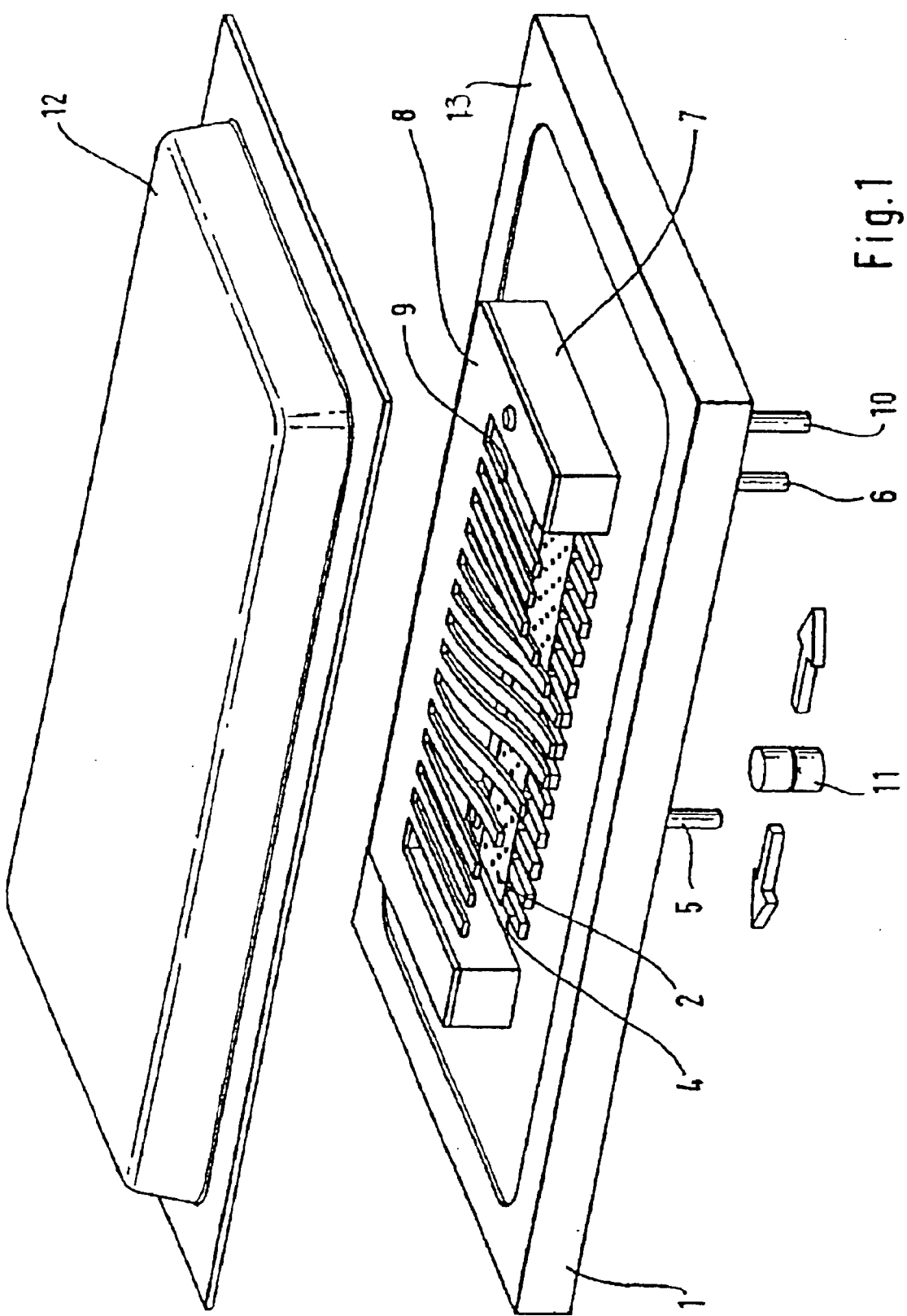
FIG. 1 shows an exemplary embodiment of the position sensor as a potentiometer.

In FIG. 1, the structure of a linear passive magnetic position sensor on the basis of a thick film arrangement is schematically represented in the form of a potentiometer. The nonmagnetic substrate 1 bears a resistance network in the form of a resistor track 2 which is in the form of a layer and extends between the electrical terminals 5 and 6.

Figure 2:
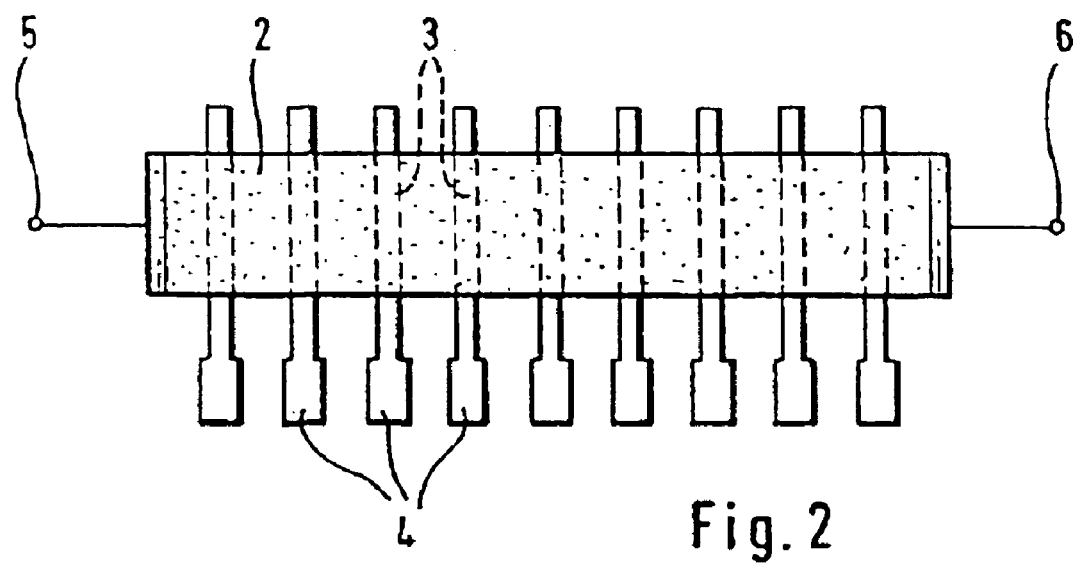
FIG. 2 shows a resistor track with a conductor track in plan view.

As can be seen from FIG. 2, arranged parallel to one another under the resistor track 2 at equal intervals on the substrate are a number of conductor tracks 3. These conductor tracks 3 have been applied directly to the substrate 1, perpendicularly to the resistor track 2. The conductor tracks 3 are partly covered by the resistor track 2. In this case, the end of each conductor track 3 forms a contact area 4, which is coated with gold or silver.

Figure 3:
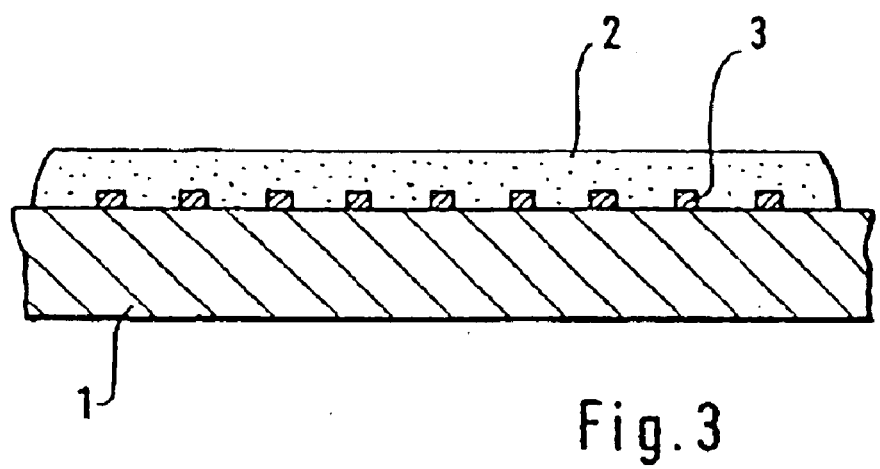
FIG. 3 shows a resistor track with a conductor track in section.

The sectional representation in FIG. 3 shows that, in the region of the resistor track 2, the conductor tracks 3 are completely enclosed by the latter, in order to ensure reliable electrical contacting. According to FIG. 1, arranged on the substrate, parallel to the resistor track 2, is a spacer 7, on which a one-piece, comb-shaped bending beam structure 8 has been applied in the form of a soft-magnetic foil. As an alternative to this, the bending beam structure consists of nonmagnetic material which is provided with a magnetic layer. The comb-shaped soft-magnetic bending beam structure 8 comprises freely movable bending beams 9 which are supported at one end. The bending beams 9 are electrocoated with a gold or silver layer to reduce the contact resistance.

The spacer 7 keeps the freely movable ends of the bending beam structure 8 at a defined distance from the contact areas 4. The freely movable ends of the bending beams 9 are arranged such that they cover the contact areas 4. In this arrangement, the bending beam structure 8 formed as a soft-magnetic foil is itself electrically conductive and is in connection with the external electrical terminal 10.

As already explained, the resistor track 2 is electrically connected via the terminals 5 and 6 to ground and to the operating voltage $U_B$. The signal voltage $U_{OUT}$ of the position sensor can be picked up via the electrical terminal 10, which is connected to the bending beam structure 8. The signal voltage $U_{OUT}$ is variable in the range from 0 volts to $U_B$ and represents the position of a permanent magnet 11.

Figure 4:
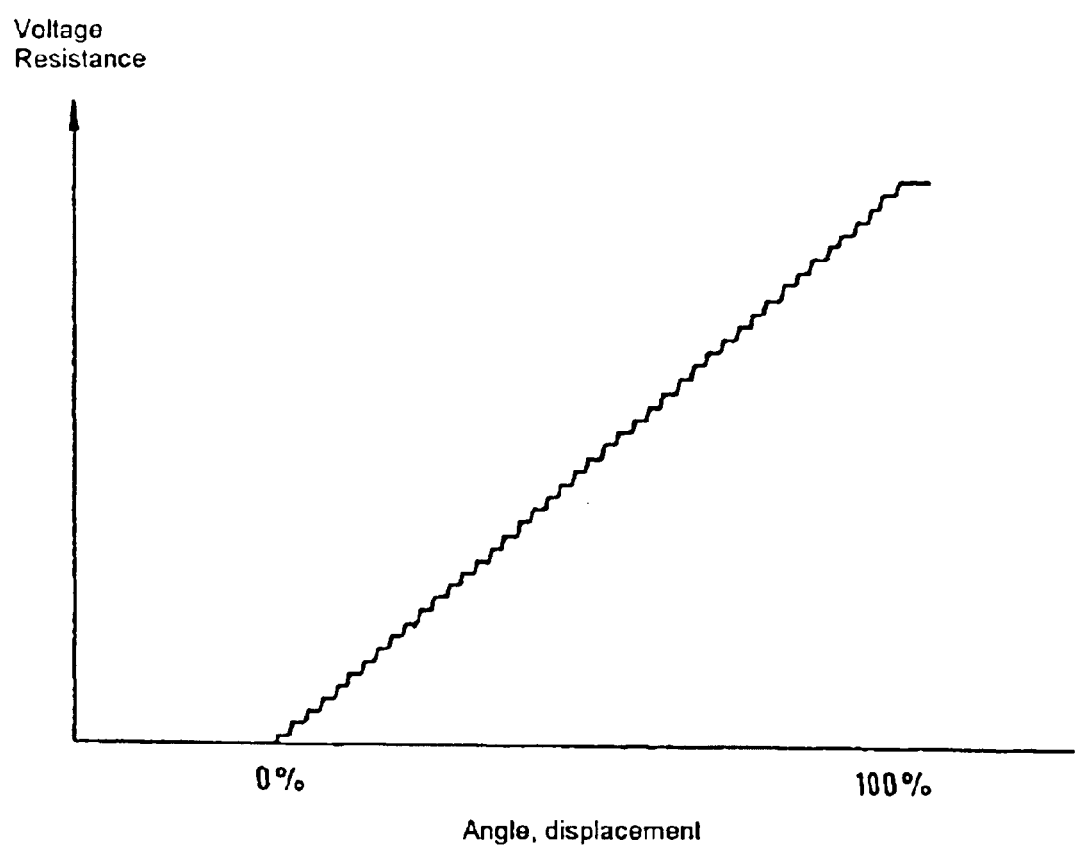
FIG. 4 shows an output signal of the position sensor.

The permanent magnet 11, which is arranged outside the housing 1, 12 movably with respect to the remote side of the substrate 1 bearing the resistor track 2, is moved in the region where the contact areas 4 are covered by the freely movable ends of the bending beams 9 supported at one end. The freely movable ends of the bending beams 9 of the bending beam structure 8 are drawn by the magnetic field of the permanent magnet 11 onto the contact areas 4 and contacted. In a way corresponding to the position of the permanent magnet 11, an electrical connection is produced with respect to the associated resistors of the resistance network and a signal voltage $U_{OUT}$ corresponding to this position is picked up. In this case, a stepped output signal is generated, as represented in FIG. 4.

The width of the permanent magnet 11 is dimensioned in such a way that a number of freely movable ends 9 of the bending beam structure 8 lying next to one another are simultaneously contacted by the corresponding contact areas and consequently act in a redundant manner, so that any contact interruptions do not lead to complete signal failure of the measuring system.

The insulating substrate 1 bearing the resistor track 2 and the soft-magnetic foil 8 comprises a ceramic sheet. This serves at the same time as a housing wall of the position sensor, which is closed by a housing cover 12. The material of the housing cover 12 and the substrate 1 have in this case the same or a similar coefficient of thermal expansion and can be soldered, welded or adhesively bonded.

A non-magnetic housing cover 12 is advantageously used. A metallized layer (not shown), as the peripheral edge on the insulating substrate 1, serves for the encapsulation of the position sensor. To improve the solderability, the metal layer 17 is tin-coated. To realize the electrical terminals 5, 6, 10, pins are led through the insulating substrate 1 and soldered or welded there in a hermetically sealed and consequently corrosion-resistant manner to the resistor track 2 or the bending beam structure 8.

Figure 5:
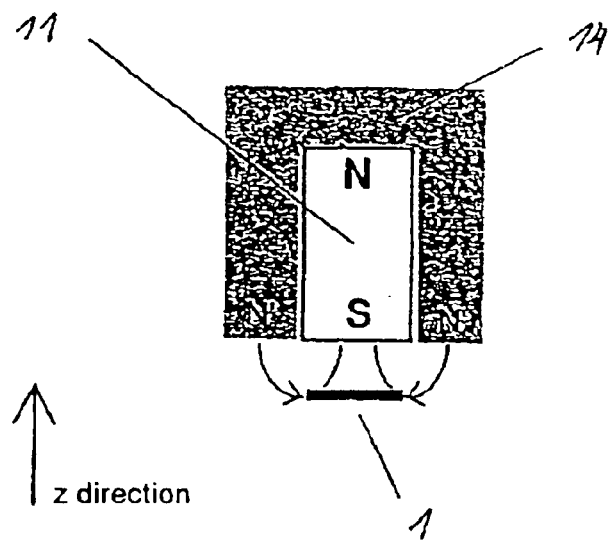
FIG. 5 shows a first exemplary embodiment of the magnet with a flux guiding device.
Figure 6:
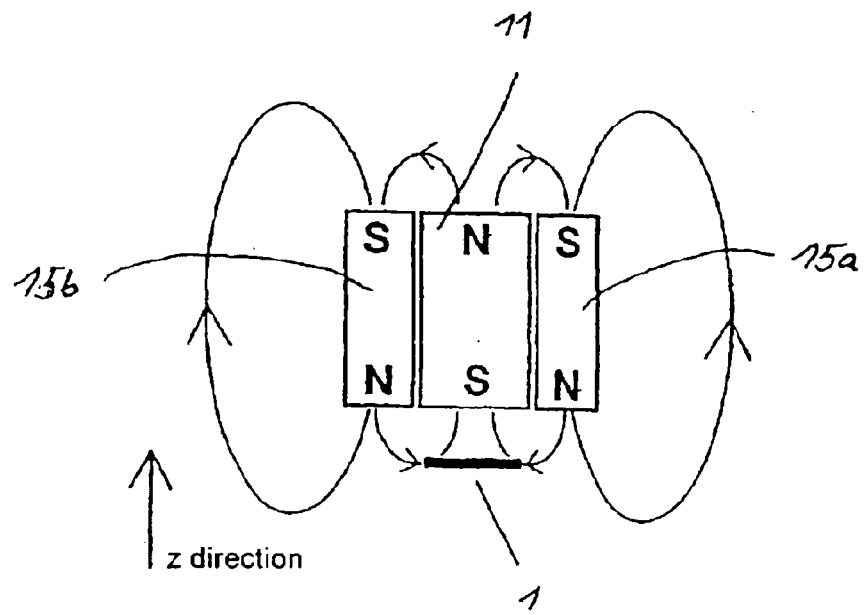
FIG. 6 shows a second embodiment of the magnet with a flux guiding device.

In order to increase the force of attraction of the magnet 11 in the region of the sensor, the gradient of the undisturbed magnetic field (the field without the presence of the sensor, which is indicated in FIGS. 5 and 6 only by the housing cover 12) in the direction transverse to the housing cover is increased at the position of the latter. This can be achieved in various ways.

FIG. 5 shows an arrangement which concentrates the undisturbed magnetic field more favorably for the purpose of increasing the force of attraction. A magnetically permeable steel cap 14 with a u-shaped cross section is fitted onto the original permanent magnet 11. The permanent magnet 11 is in this case polarized in such a way that its south pole lies directly opposite the substrate 1. The direction of magnetization of the magnet 11 corresponds in this case to the direction of movement of the bending beams 9 of the bending beam structure 8. Virtual magnetic poles form at the free ends of the u-shaped cross section of the steel cap 14. Consequently, the undisturbed field (field in the air) without the substrate 1 is concentrated in such a way that a considerable increase of the field gradient is achieved at the position of the substrate 1.

The same effect can be induced by surrounding the basic permanent magnet 11 laterally with two permanent magnets 15a, 15b, which are provided with a magnetization in the opposite direction than that of the permanent magnet 11.

What is claimed is:

1. A passive position sensor, comprising a substrate with a resistance network which is arranged on this substrate and is assigned a contact spring structure, which can be deflected under the action of a permanent magnet, with electrical connection between the resistance network and the contact spring structure being established by contact which is dependent on the position of the permanent magnet, the contact spring structure and the resistance structure being enclosed in a sealed housing and the permanent magnet being movable outside the sealed housing, characterized in that the permanent magnet (11) is polarized in the direction of movement of the contact spring structure (8), a flux guiding device (14; 15a, 15b) for increasing the concentration of the force of attraction of the undisturbed magnetic field being arranged near the permanent magnet (11).

2. The passive position sensor as claimed in claim 1, characterized in that the flux guiding device (14; 15a, 15b) is formed as a magnetically permeable cap (14) which can be fitted onto the permanent magnet (11).

3. The passive position sensor as claimed in claim 1, characterized in that the flux guiding device (14; 15a, 15b) comprises two additional auxiliary magnets (15a, 15b), the permanent magnet (11) being arranged between the two auxiliary magnets (15a, 15b) and the direction of magnetization of the auxiliary magnets (15a, 15b) being opposed to the direction of magnetization of the permanent magnet (11).

4. The passive position sensor as claimed in claim 1, characterized in that the housing (1, 12) is nomagnetically formed.

* * * * *